US010750006B2

(12) United States Patent
Weiss et al.

(10) Patent No.: US 10,750,006 B2
(45) Date of Patent: *Aug. 18, 2020

(54) SYSTEM AND METHOD FOR MOBILE DEVICE CONTROL DELEGATION

(71) Applicant: Location Labs, Inc., Emeryville, CA (US)

(72) Inventors: Andrew Weiss, San Ramon, CA (US); Tasos Roumeliotis, Orinda, CA (US); Sourya Roy, San Francisco, CA (US)

(73) Assignee: Location Labs, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,501

(22) Filed: Sep. 27, 2018

(65) Prior Publication Data

US 2019/0028585 A1 Jan. 24, 2019

Related U.S. Application Data

(62) Division of application No. 14/291,983, filed on May 30, 2014, now Pat. No. 10,148,805.

(51) Int. Cl.
*H04M 1/725* (2006.01)
*H04W 4/021* (2018.01)
*H04W 24/08* (2009.01)

(52) U.S. Cl.
CPC ... *H04M 1/72577* (2013.01); *H04M 1/72572* (2013.01); *H04W 4/021* (2013.01); *H04W 24/08* (2013.01)

(58) Field of Classification Search
CPC ......... H04M 1/72577; H04M 1/72572; H04W 4/021; H04W 24/08
See application file for complete search history.

(56) References Cited

U.S. PATENT DOCUMENTS 3,778,809 A 12/1973 Hawes
4,956,825 A 9/1990 Wilts et al.
(Continued)

FOREIGN PATENT DOCUMENTS

FR 2863439 A1 6/2005
GB 1770969 4/2007
WO WO 2011137279 3/2011

OTHER PUBLICATIONS

Kohavi, "Emerging Trends in Business Analytics", Communications of the ACM, Aug. 2002, vol. 45, No. 8, pp. 45-48.

*Primary Examiner* — Marcos L Torres
(74) *Attorney, Agent, or Firm* — Dovas Law, P.C.

(57) ABSTRACT

A system and method for implementing controls corresponding to a particular mobile device. The method includes receiving from a first party corresponding to the particular mobile device a designation of a second party and receiving control instructions from the second party. A particular geographic area and/or a particular time frame is associated with the second party. A processor alternately delegates one or more device controls of the particular mobile device from the first party to the second party based on a current location of the particular mobile device relative to the particular geographic area and/or a current time relative to the particular time frame. The control instructions received from the second party are applied when the one or more device controls are delegated to the second party.

8 Claims, 5 Drawing Sheets

(56) References Cited

U.S. PATENT DOCUMENTS

| | | |
|---|---|---|
| 5,434,562 A | 7/1995 | Reardon |
| 5,673,691 A | 10/1997 | Abrams et al. |
| 5,882,258 A | 3/1999 | Kelly et al. |
| 5,907,831 A | 5/1999 | Lotvin et al. |
| 5,973,683 A | 10/1999 | Cragun et al. |
| 6,011,973 A | 1/2000 | Valentine et al. |
| 6,023,692 A | 2/2000 | Nichols |
| 6,161,008 A | 12/2000 | Lee et al. |
| 6,529,724 B1 | 4/2003 | Khazaka et al. |
| 6,690,940 B1 | 2/2004 | Brown et al. |
| 6,731,746 B1 | 5/2004 | Usami |
| 6,782,266 B2 | 8/2004 | Baer et al. |
| 7,178,720 B1 | 2/2007 | Strubbe |
| 7,181,229 B2 | 2/2007 | Singh et al. |
| 7,257,367 B2 | 8/2007 | Etuk et al. |
| 7,272,633 B2 | 9/2007 | Malik et al. |
| 7,705,726 B2 | 4/2010 | Graves et al. |
| 7,729,945 B1 | 6/2010 | Katz et al. |
| 7,839,891 B1 | 11/2010 | Allan |
| 7,869,792 B1 | 1/2011 | Zhou et al. |
| 7,876,704 B1 | 1/2011 | Bims et al. |
| 7,899,438 B2 | 3/2011 | Baker et al. |
| 7,925,690 B2 | 4/2011 | Smith et al. |
| 8,010,037 B2 | 8/2011 | Bannwolf |
| 8,024,290 B2 | 9/2011 | Yang et al. |
| 8,095,175 B2 | 1/2012 | Todd et al. |
| 8,095,413 B1 | 1/2012 | Beaven |
| 8,107,432 B2 | 1/2012 | Seo |
| 8,121,879 B1 | 2/2012 | Cohen |
| 8,135,392 B2 | 3/2012 | Marcellino et al. |
| 8,160,560 B2 | 4/2012 | Geyer et al. |
| 8,175,642 B2 | 5/2012 | Shah |
| 8,185,953 B2 | 5/2012 | Rothstein et al. |
| 8,193,982 B2 | 6/2012 | Kupfer et al. |
| 8,255,413 B2 | 7/2012 | De et al. |
| 8,249,627 B2 | 8/2012 | Olincy et al. |
| 8,270,933 B2 | 9/2012 | Riemer et al. |
| 8,280,438 B2 | 10/2012 | Barbera |
| 8,351,408 B2 | 1/2013 | Daigle |
| 8,384,555 B2 | 2/2013 | Rosen |
| 8,401,521 B2 | 3/2013 | Bennett et al. |
| 8,412,154 B1 | 4/2013 | Leemet et al. |
| 8,417,268 B1 | 4/2013 | Halferty et al. |
| 8,527,013 B2 | 9/2013 | Guba et al. |
| 8,594,065 B2 | 11/2013 | Polito et al. |
| 8,620,354 B2 | 12/2013 | Beasley |
| 8,621,075 B2 | 12/2013 | Luna |
| 8,635,708 B2 | 1/2014 | Mahan |
| 8,731,530 B1 | 5/2014 | Breed et al. |
| 8,738,688 B2 | 5/2014 | Myers et al. |
| 8,761,821 B2 | 6/2014 | Tibbitts et al. |
| 8,849,095 B2 | 9/2014 | Hoofien et al. |
| 8,971,927 B2 | 3/2015 | Zhou et al. |
| 8,982,781 B2 | 3/2015 | Starr |
| 9,019,068 B2 | 4/2015 | Varoglu |
| 9,042,872 B1 | 5/2015 | Breed et al. |
| 9,124,703 B2 | 9/2015 | Tayadon et al. |
| 9,723,092 B1 | 8/2017 | Kashanian |
| 2002/0012894 A1 | 1/2002 | Becker |
| 2002/0174180 A1 | 11/2002 | Brown et al. |
| 2002/0178046 A1 | 11/2002 | Lawrence |
| 2003/0005306 A1 | 1/2003 | Hunt et al. |
| 2003/0082508 A1 | 5/2003 | Barney |
| 2003/0211889 A1 | 11/2003 | Walker et al. |
| 2003/0216138 A1 | 11/2003 | Higuchi et al. |
| 2004/0024569 A1 | 2/2004 | Camillo |
| 2004/0030599 A1 | 2/2004 | Sie et al. |
| 2004/0039624 A1 | 2/2004 | Ikezawa et al. |
| 2004/0083472 A1 | 4/2004 | Rao et al. |
| 2004/0166878 A1 | 8/2004 | Erskine et al. |
| 2004/0203895 A1 | 10/2004 | Balasuriya |
| 2004/0219493 A1 | 11/2004 | Phillips |
| 2004/0267607 A1 | 12/2004 | Maddux |
| 2005/0003895 A1 | 1/2005 | Nara |
| 2005/0096009 A1 | 5/2005 | Ackley |
| 2005/0287502 A1 | 12/2005 | Southard et al. |
| 2006/0085419 A1 | 4/2006 | Rosen |
| 2006/0085547 A1 | 4/2006 | Cormier |
| 2006/0184792 A1 | 8/2006 | Berlin |
| 2006/0270476 A1 | 11/2006 | Denkewicz |
| 2006/0276180 A1 | 12/2006 | Henry |
| 2007/0039624 A1 | 2/2007 | Roberts et al. |
| 2007/0041545 A1 | 2/2007 | Gainsboro |
| 2007/0203872 A1 | 8/2007 | Flinn et al. |
| 2007/0208802 A1 | 9/2007 | Barman et al. |
| 2007/0263843 A1 | 11/2007 | Foxenland |
| 2008/0146211 A1 | 6/2008 | Mikan et al. |
| 2008/0176585 A1 | 7/2008 | Eldering |
| 2008/0199199 A1 | 8/2008 | Kato et al. |
| 2008/0201441 A1 | 8/2008 | Bodic et al. |
| 2008/0201469 A1 | 8/2008 | Reasor et al. |
| 2008/0246605 A1 | 10/2008 | Pfeffer et al. |
| 2008/0294589 A1 | 11/2008 | Chu et al. |
| 2008/0299954 A1 | 12/2008 | Wright et al. |
| 2009/0002147 A1 | 1/2009 | Bloebaum et al. |
| 2009/0017750 A1 | 1/2009 | Marcinkiewicz |
| 2009/0038005 A1 | 2/2009 | Howarth |
| 2009/0055938 A1 | 2/2009 | Samuel |
| 2009/0064316 A1 | 3/2009 | Liao et al. |
| 2009/0089876 A1 | 4/2009 | Finamore et al. |
| 2009/0181356 A1 | 7/2009 | Dasgupta |
| 2009/0203352 A1 | 8/2009 | Fordon et al. |
| 2009/0204471 A1 | 8/2009 | Elenbaas et al. |
| 2009/0247124 A1 | 10/2009 | De Atley et al. |
| 2009/0248436 A1 | 10/2009 | Takagi et al. |
| 2009/0251282 A1 | 10/2009 | Fitzgerald et al. |
| 2009/0271247 A1 | 10/2009 | Karelin et al. |
| 2009/0286218 A1 | 11/2009 | Johnson et al. |
| 2009/0298019 A1 | 12/2009 | Rogan et al. |
| 2009/0325566 A1 | 12/2009 | Bell et al. |
| 2010/0028844 A1 | 2/2010 | Wiseman |
| 2010/0037088 A1 | 2/2010 | Krivopaltsev et al. |
| 2010/0058446 A1 | 3/2010 | Thwaites |
| 2010/0076274 A1 | 3/2010 | Severson |
| 2010/0100398 A1 | 4/2010 | Auker et al. |
| 2010/0100618 A1 | 4/2010 | Kuhlke et al. |
| 2010/0106573 A1 | 4/2010 | Gallagher et al. |
| 2010/0113013 A1 | 5/2010 | Karabinis et al. |
| 2010/0116884 A1 | 5/2010 | Alderucci et al. |
| 2010/0125028 A1 | 5/2010 | Heppert |
| 2010/0145976 A1 | 6/2010 | Higgins et al. |
| 2010/0154024 A1 | 6/2010 | Boxmeyer et al. |
| 2010/0210254 A1 | 8/2010 | Kelly et al. |
| 2010/0211887 A1 | 8/2010 | Woollcombe |
| 2010/0235223 A1 | 9/2010 | Lyman |
| 2010/0250352 A1 | 9/2010 | Moore |
| 2010/0251336 A1 | 9/2010 | Allen et al. |
| 2010/0268768 A1 | 10/2010 | Kurtenbach et al. |
| 2010/0285871 A1 | 11/2010 | Shah et al. |
| 2010/0317420 A1 | 12/2010 | Hoffberg |
| 2010/0330543 A1 | 12/2010 | Black et al. |
| 2010/0330972 A1 | 12/2010 | Angiolilo |
| 2011/0029598 A1 | 2/2011 | Arnold |
| 2011/0040586 A1 | 2/2011 | Murray et al. |
| 2011/0045868 A1 | 2/2011 | Sheha et al. |
| 2011/0047078 A1 | 2/2011 | Ginter et al. |
| 2011/0055546 A1 | 3/2011 | Klassen et al. |
| 2011/0070567 A1 | 3/2011 | Linton |
| 2011/0092159 A1 | 4/2011 | Park et al. |
| 2011/0093161 A1 | 4/2011 | Zhou et al. |
| 2011/0117878 A1 | 5/2011 | Barash et al. |
| 2011/0151830 A1 | 6/2011 | Blanda et al. |
| 2011/0231280 A1 | 9/2011 | Farah |
| 2011/0236872 A1 | 9/2011 | Taylor |
| 2011/0244825 A1 | 10/2011 | Ewell, Jr. |
| 2011/0244837 A1 | 10/2011 | Murata et al. |
| 2011/0252375 A1 | 10/2011 | Chaudhri |
| 2011/0275321 A1 | 11/2011 | Zhou et al. |
| 2011/0294520 A1 | 12/2011 | Zhou et al. |
| 2011/0296014 A1 | 12/2011 | Cancel et al. |
| 2011/0302003 A1 | 12/2011 | Shirish et al. |
| 2011/0307434 A1 | 12/2011 | Rostampour et al. |
| 2012/0001548 A1 | 1/2012 | Recker et al. |
| 2012/0036220 A1 | 2/2012 | Dare et al. |

(56) References Cited

U.S. PATENT DOCUMENTS

| | | |
|---|---|---|
| 2012/0058744 A1 | 3/2012 | Felt et al. |
| 2012/0066088 A1 | 3/2012 | Murset |
| 2012/0069131 A1 | 3/2012 | Abelow |
| 2012/0081500 A1 | 4/2012 | Border et al. |
| 2012/0083287 A1 | 4/2012 | Casto et al. |
| 2012/0084349 A1 | 4/2012 | Lee et al. |
| 2012/0110071 A1 | 5/2012 | Zhou et al. |
| 2012/0131161 A1 | 5/2012 | Ferris et al. |
| 2012/0135705 A1 | 5/2012 | Thaker |
| 2012/0142379 A1 | 6/2012 | Park |
| 2012/0149352 A1 | 6/2012 | Backholm et al. |
| 2012/0166285 A1 | 6/2012 | Shapiro et al. |
| 2012/0171990 A1 | 7/2012 | Williams et al. |
| 2012/0172027 A1* | 7/2012 | Partheesh ............ H04W 4/021 455/420 |
| 2012/0172100 A1 | 7/2012 | Colar et al. |
| 2012/0179767 A1 | 7/2012 | Clarke et al. |
| 2012/0188163 A1 | 7/2012 | Xiao |
| 2012/0192016 A1 | 7/2012 | Gotesdyner et al. |
| 2012/0195295 A1 | 8/2012 | Elmaleh |
| 2012/0214472 A1 | 8/2012 | Tayadon et al. |
| 2012/0215328 A1 | 8/2012 | Schmelzer |
| 2012/0223861 A1 | 9/2012 | Kupfer et al. |
| 2012/0226704 A1 | 9/2012 | Boland et al. |
| 2012/0237908 A1 | 9/2012 | Fitzgerald et al. |
| 2012/0244883 A1 | 9/2012 | Tibbitts et al. |
| 2012/0254949 A1 | 10/2012 | Mikkonen et al. |
| 2012/0258740 A1 | 10/2012 | Mildh et al. |
| 2012/0260118 A1 | 10/2012 | Jiang et al. |
| 2012/0271908 A1 | 10/2012 | Luna et al. |
| 2012/0280916 A1 | 11/2012 | Xia et al. |
| 2012/0315880 A1 | 12/2012 | Peitrow et al. |
| 2012/0323990 A1 | 12/2012 | Hayworth |
| 2012/0330702 A1 | 12/2012 | Kowalski et al. |
| 2013/0040629 A1* | 2/2013 | Sprigg ................. H04W 4/50 455/419 |
| 2013/0047229 A1 | 2/2013 | Hoefel et al. |
| 2013/0054674 A1 | 2/2013 | Myers et al. |
| 2013/0082878 A1 | 4/2013 | Jarvis et al. |
| 2013/0084847 A1 | 4/2013 | Tibbitts et al. |
| 2013/0091453 A1 | 4/2013 | Kotler et al. |
| 2013/0104246 A1 | 4/2013 | Bear et al. |
| 2013/0111462 A1 | 5/2013 | Umansky et al. |
| 2013/0143512 A1 | 6/2013 | Hernandez et al. |
| 2013/0143521 A1 | 6/2013 | Hernandez et al. |
| 2013/0143528 A1 | 6/2013 | Randazzo et al. |
| 2013/0145007 A1 | 6/2013 | Randazzo et al. |
| 2013/0150004 A1 | 6/2013 | Rosen |
| 2013/0185411 A1 | 7/2013 | Martin |
| 2013/0198272 A1 | 8/2013 | Shionoya et al. |
| 2013/0198296 A1 | 8/2013 | Roy et al. |
| 2013/0217331 A1 | 8/2013 | Manente |
| 2013/0217363 A1 | 8/2013 | Myers |
| 2013/0225151 A1 | 8/2013 | King et al. |
| 2013/0303106 A1 | 11/2013 | Martin |
| 2013/0305384 A1 | 11/2013 | Weiss |
| 2013/0316746 A1 | 11/2013 | Miller et al. |
| 2013/0332886 A1 | 12/2013 | Cranfill et al. |
| 2013/0339345 A1 | 12/2013 | Soto et al. |
| 2013/0346333 A1 | 12/2013 | Hassler et al. |
| 2014/0082065 A1 | 3/2014 | Anakata |
| 2014/0108649 A1 | 4/2014 | Barton et al. |
| 2014/0113558 A1 | 4/2014 | Varoglou et al. |
| 2014/0148192 A1 | 5/2014 | Hodges |
| 2014/0155094 A1* | 6/2014 | Zises .................... H04W 4/021 455/456.3 |
| 2014/0180438 A1 | 6/2014 | Hodges |
| 2014/0310327 A1 | 10/2014 | Yip et al. |
| 2014/0310365 A1 | 10/2014 | Sample et al. |
| 2014/0310403 A1 | 10/2014 | Weiss |
| 2014/0338006 A1 | 11/2014 | Grkov et al. |
| 2015/0040246 A1 | 2/2015 | Yuen et al. |
| 2015/0079965 A1 | 3/2015 | Mullins |
| 2015/0163664 A1 | 6/2015 | Martin |
| 2015/0188777 A1 | 7/2015 | Frost |
| 2015/0227752 A1 | 8/2015 | Anakata |
| 2015/0350410 A1 | 12/2015 | Weiss |
| 2017/0135045 A1 | 5/2017 | Hodges et al. |
| 2017/0245111 A1 | 8/2017 | Hodges et al. |

* cited by examiner

SYSTEM AND METHOD FOR MOBILE DEVICE CONTROL DELEGATION

CROSS REFERENCE TO RELATED APPLICATION(S)

This application is a division of U.S. patent application Ser. No. 14/291,983, which was filed May 30, 2014 and which is incorporated by reference as if fully set forth.

BACKGROUND

With the advent of smartphones, laptops, tablets and other portable electronic devices, a child may now have untethered access to the Internet, various communication protocols (e.g. phone, video phone, email, text chatting, and text messaging), and a wide variety of digital entertainment. However, such devices may serve as a distraction which prevents a child from behaving responsibly. Parents are keen to keep an eye on their children's behavior including communication, travel and what media and information their children are exposed to. Further, parents may want to limit the amount of time their children spend exploring and consuming various electronic media (e.g. television and Internet content).

School teachers and administrators also have an interest in keeping the children in their classes focused on class work without distractions from the children's portable electronic devices. Many, perhaps most children bring their mobile devices to school. Children send text messages during class, browse the web, and play gaming applications such as Angry Birds™. Schools would like to be able to impose constraints on such usage by limiting what kinds of activities children can engage in with their mobile devices while on school premises or engaged in school activities.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of implementing controls corresponding to a particular mobile device is provided. The method includes receiving from a first party corresponding to the particular mobile device a designation of a second party and receiving control instructions from the second party. A particular geographic area and/or a particular time frame is associated with the second party. A processor alternately delegates one or more device controls of the particular mobile device from the first party to the second party based on a current location of the particular mobile device relative to the particular geographic area and/or a current time relative to the particular time frame. The control instructions received from the second party are applied when the one or more device controls are delegated to the second party.

A method of implementing controls corresponding to a particular mobile device is provided. The method includes receiving a first instruction set corresponding to a first user account of a first party, the first instruction set directed to at least one of mobile device monitoring and mobile device control. The method further includes receiving a second instruction set corresponding to a second user account of a second party, the second instruction set directed to at least one of mobile device monitoring and mobile device control. One or more processors alternately apply the first instruction set and the second instruction set based on at least one of a time of day, a day of week, and a location of the particular mobile device to at least one of monitor and control use of a particular mobile device.

A computing system is provided including at least one non-transitory computer readable storage medium having encoded thereon instructions that, when executed by one or more processors of the system, cause the system to perform a process. The process includes receiving from a first party corresponding to the particular mobile device a designation of a second party and receiving control instructions from the second party. A particular geographic area and/or a particular time frame is associated with the second party. A processor alternately delegates one or more device controls of the particular mobile device from the first party to the second party based on a current location of the particular mobile device relative to the particular geographic area and/or a current time relative to the particular time frame. The control instructions received from the second party are applied when the one or more device controls are delegated to the second party.

Non-transitory computer-readable media is provided tangibly embodying a program of instructions executable by at least one processor-enabled computing system to implement a method, the at least one computing system being capable of interfacing with a communications network. The method includes receiving from a first party corresponding to the particular mobile device a designation of a second party and receiving control instructions from the second party. A particular geographic area and/or a particular time frame is associated with the second party. A processor alternately delegates one or more device controls of the particular mobile device from the first party to the second party based on a current location of the particular mobile device relative to the particular geographic area and/or a current time relative to the particular time frame. The control instructions received from the second party are applied when the one or more device controls are delegated to the second party.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
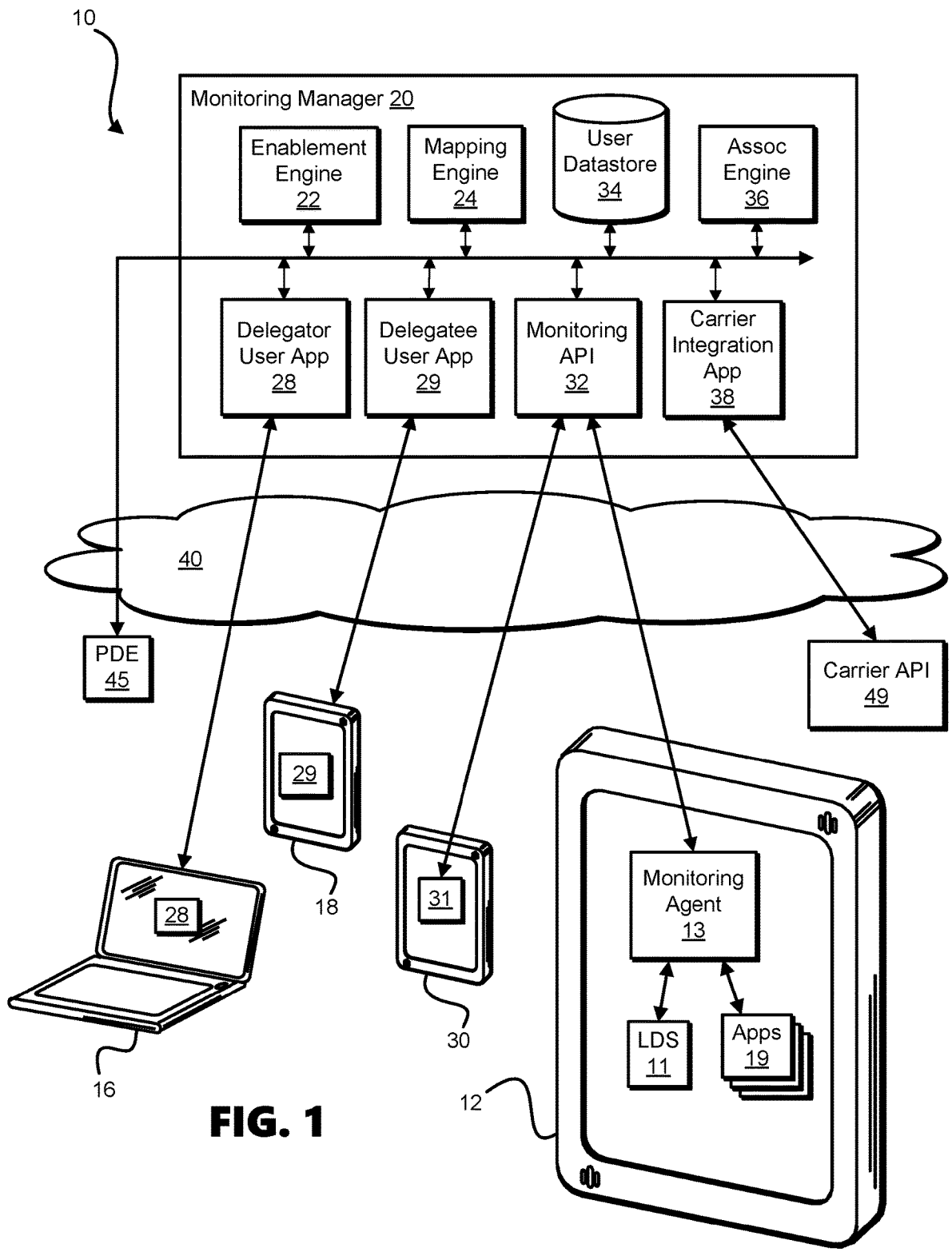
FIG. 1 is a diagram showing a system including a monitoring manager for monitoring and controlling use of a mobile device.

Described herein are a system and methods for a user to delegate aspects of control of a mobile device, for example a device used by their child, to a particular party, for example a school attended by such child. Embodiments are described below with reference to the drawing figures where like numerals represent like elements throughout.

The term "delegate" is used herein to denote empowering or granting permission to a party to implement mobile device controls. The use of the term "delegate" does not suggest or imply an abdication or relinquishment of controls by the delegating user. According to the described system and methods, a delegating user can maintain complete device control when aspects of control are delegated and override any controls instituted by a delegatee.

Referring to FIG. 1, a system 10 is provided including a monitoring manager 20 used for monitoring and controlling use of a mobile device 12 ("monitored device 12"). The monitoring manager 20 includes an enablement engine 22, a mapping engine 24, a delegator user application 28, a delegatee user application 29, a monitoring application program interface ("API") 32, a user datastore 34, and a carrier integration application 38. The monitoring manager 20 can be implemented on one or more network-connectable computing systems and need not be implemented on a single system at a single location. The monitoring manager 20 is configured for communication via a network 40 with other network-connectable computing systems including one or more mobile devices 12 ("monitored devices 12") corresponding to a monitored user, client devices 16 corresponding to users who provide instructions via the delegator user application 28, client devices 29 corresponding to users who provide instructions via the delegatee user application 29, and one or more mobile devices 30 ("reporting device 30") configured to report its location to the monitoring manager 20. Alternatively, the monitoring manager 20 or one or more components thereof can be executed on the monitored device 12 or other system. The overseeing user application 28 and delegatee applications include web applications or other applications enabled by the monitoring manager 20 and accessible to a client device 16, 18 via a network, or alternatively, the applications 28, 29 can be installed and executed (in whole or in part) on a client device 16, 18.

The network 40 can include one or more wired or wireless networks, including for example the internet and wireless carrier systems. The monitored device 12, client devices 16, 18, and reporting device 30 can include for example a smartphone, laptop computer or other wired or wireless terminal preferably configured to operate on a wired or wireless telecommunication network. The operation of the monitoring manager 20 is described herein with respect to the devices 12, 16, 18, 30. One skilled in the art will recognize that the monitoring manager 20 can operate with other suitable wired or wireless network-connectable computing systems.

Software and/or hardware residing on a monitored device 12 enables a control and monitoring agent 13 ("monitoring agent 13") in the form of a client application which can provide device location information and device use information to the monitoring manager 20 via the monitoring API 32. The monitoring agent 13 can further partially or completely enable or disable particular functional components of the monitored device 12. A functional component is a hardware or software component of the monitored device 12 which enables a particular functionality such as electronic messaging, photo messaging, telephone communication, internet usage, camera usage, video camera usage, or application execution. Applications 19 on the monitored device 12 can include for example a gaming application, a social networking application, a video playing application, an internet browser, or any application executable using the monitored device 12.

In addition to components enabling data processing and wireless communication, the monitored device 12 includes a location determination system ("LDS") 11, such as a global positioning system ("GPS") receiver, from which the monitoring agent 13 gathers data used for determining location of the monitored device 12. A monitored user operates the monitored device 12 with the monitoring agent 13 active.

The components of the described system 10 including the monitoring manager 20 and monitoring agent 13 provide a user ("delegator") the ability to delegate control of a monitored device 12 to a particular party ("delegatee") in a way that respects the privacy of the delegator and the user of the monitored device 12 ("monitored user"), while preventing abusive behavior on the part of the delegatee. The user of the device 12 can be for example a child, and the delegator can be a parent of the child.

The monitoring manager 20, for example enabled by a network connectable server, stores delegatee account data in the user datastore 34. Such data can include a delegatee identifier, a static or dynamic geographic area associated with the delegatee, and delegatee defined constraints on use of the monitored device 12, for example constraints on phone communications and application execution.

The monitoring manager 20 further stores delegator account data in the user datastore 34. Such data can include a delegator identifier and delegator defined exceptions to delegatee constraints. Exceptions can include a phone number white list including phone numbers which can be called regardless of delegatee constraints on phone communications and an application white list including applications which can be executed by the monitored device 12 regardless of delegatee constraints on application execution. Such account data can further include an indication provided by the delegator to disallow the delegatee from receiving an alert from the monitoring manager 20 responsive to the monitored device 12 not being on a geographic area corresponding to the delegatee, for example the monitored device 12 not being on school property.

A particular delegatee constraint includes the requirement that the monitored user be located within a particular location area, wherein when the monitored device 12 is not within the particular location area an alert is generated and provided to the delegatee and/or the delegator. The alert can include an email, electronic text message, or automated phone message. This particular location area can be for example the geographic area associated with the delegatee, which can correspond to a latitude and longitude of a property associated with the delegatee, for example a school building or school grounds, wherein the constraint requires the monitored user to be in the school building or on the school grounds. Optionally, a time constraint can be specified indicating a particular time range in which the monitored device 12 must remain in the location area to avoid triggering an alert. For example it can be required that a particular monitored user, a school aged child, must remain on school property between 9:00 AM and 3:00 PM, and if the monitored device 12 leaves school property during this time frame in violation of the constraint, an alert is triggered notifying the school, the delegatee, or the child's parent, the delegator.

Another delegatee constraint includes the requirement that the monitored user be located within a particular dynamic location area. When the monitored device 12 is determined to be not within the particular dynamic location area an alert is generated and provided to the delegatee and/or the delegator. This particular location area can be defined based on the position of a mobile device 30 associated with the delegatee. The mobile device 30 can for example be carried by a teacher or school administrator associated with a school attended by a monitored school age child who carries and uses the monitored device 12. The delegatee can provide a phone number for the mobile device 30, a time when the mobile device 30 is to be used as the basis for a dynamic location area, and a desired radius around the mobile device 30 defining the dynamic location. The association engine 36 associates the mobile device 30 to the delegatee and receives location information of the mobile device 30 via the reporting agent 31 during particular time frames when control is delegated to the delegatee. Alternatively, the monitoring manager 20 can gather location information corresponding to the mobile device 30 via a network based position determining entity 45 ("PDE"), for example enabled by a telecommunication carrier servicing the mobile device 30.

Another delegatee constraint includes disallowing mobile device use for the purpose of making phone calls and electronic messages during particular time ranges, for example between 9:00 am and 12:00 pm and between 1:00 pm and 3:00 pm (allowing phone calls and text messages during a lunch hour between 12:00 pm and 1:00 pm). Alternatively, phone calls and electronic messages can be disallowed when the monitored device 12 is determined to be located at a particular location area, for example a school property. Exceptions can be made to allow phone calls and electronic messages to particular contacts such as the police department, fire department, school officials, or other contacts designated by the delegator or delegatee.

Another delegatee constraint includes disallowing mobile device application use including for example game, browser, navigation, and video conferencing applications during particular time ranges, for example between 9:00 am and 3:00 pm. Alternatively, application use can be disallowed when the monitored device 12 is determined to be located at a particular location area, for example a school property. Exceptions can be made to allow use of particular applications such as those having an academic intent or to allow restricted browser use to access particular internet sites, for example sites with an academic intent, which exceptions can be designated by the delegator or delegatee.

A delegator interface enabled by the delegator user app 28 communicates with the monitoring manager 20 to allow a delegator to provide a phone number of a monitored device 12 to be monitored, to select one or more delegatees (e.g., school administrators) via a selectable delegatee identifier, and to define exceptions to delegatee constraints (e.g., phone number and application white lists). The delegator user app 28 is executable on or accessible by a client device 16 operated by the delegator.

A delegatee interface enabled by the delegatee user app 29 communicates with the monitoring manager 20 to allow a delegatee (e.g., school administrator) to define a set of constraints and exceptions to the set of constraints that are to be applied to monitored devices 12 associated with the delegatee's identifier. The delegatee user app 29 is executable on or accessible by a client device 18 operated by the delegatee.

A delegatee evaluator app runs on a delegatee's mobile device 30 to enable a reporting agent 31. The reporting agent 31 determines the location of the mobile device 30 and communicates the location to the monitoring manager 20 via the monitoring API 32. In the case where the delegatee is a school administrator, the mobile device 30 can be carried by a teacher or school official. Alternatively, the monitoring manager 20 can determine the location of the mobile device 30 via the PDE 45.

A monitored user evaluator app runs on a monitored device 12 to enable the monitoring agent 13 that communicates with the monitoring manager 20. The monitoring agent 13 retrieves the current state of the delegatee defined constraints and the delegator defined exceptions to the delegatee defined constraints. The monitoring agent 13 can further receive delegator constraints and delegator exceptions to the delegator's constraints. The monitoring agent 13 monitors the location of the monitored device 12 via the LDS 11, and monitors activities engaged in on the monitored device 12. When device control is delegated to the delegatee (e.g., based on location and/or time frame), monitored activities that violate delegatee constraints and are not provided as delegator exceptions are constrained.

Figure 2:
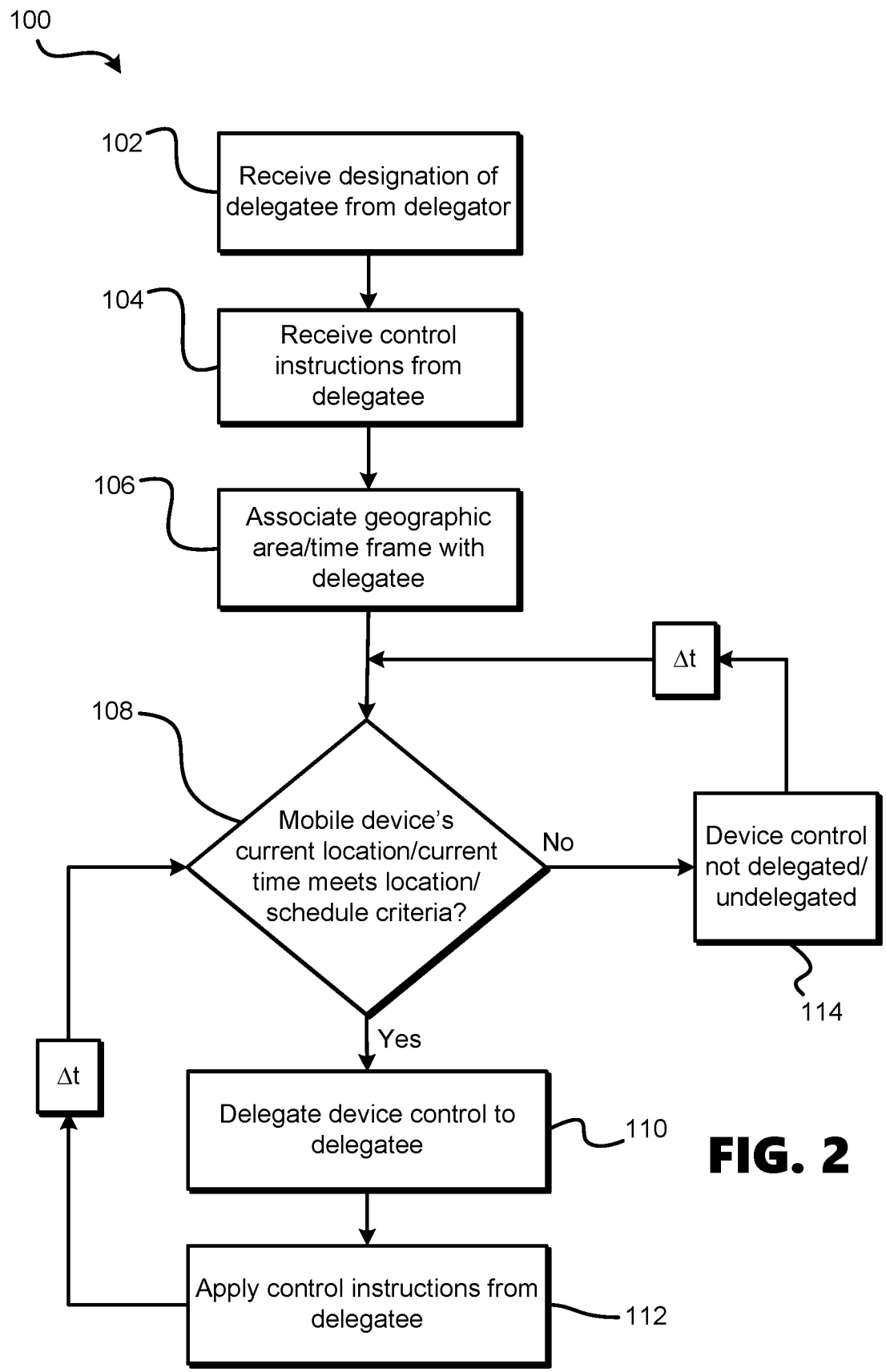
FIGS. 2 and 3 are flow charts showing methods of implementing controls corresponding to a particular mobile device.

Referring to FIG. 2, a method 100 for controlling communication device use is shown. The method 100 is described with reference to the components shown in the system 10 of FIG. 1, including the monitoring manager 20 and monitoring agent 13, which are configured for performing the method 100 and include or have access to suitable non-transitory data storage with instructions for performing the method 100. The method 100 may alternatively be performed by the monitoring agent 13 alone, the monitoring manager 20 alone, or via other suitable systems and devices. The method 100 is not limited to the components shown in FIG. 1 which are merely exemplary, and while the steps of the method 100 are provided in numbered order, they need not be performed in the particular order shown.

In a step 102, the monitoring manager 20 receives from a first party ("delegator") corresponding to a particular mobile device 12 ("monitored device 12") a designation of a second party ("delegatee"). The monitoring manager 20 enables a first user account ("delegator account") corresponding to the delegator and a second user account ("delegatee account") corresponding to the delegatee. The monitored device 12 can for example be carried by a school age child, and the delegator can be a parent or guardian of the school age child who desires to monitor and control use of the monitored device 12 by the child. The delegator can initiate setup of the delegator account via the overseeing user application 28 using a client device 16. Designation of the delegatee party is enabled by the overseeing user application 28 which provides a computer user interface showing identifiers of a plurality of parties corresponding to a plurality of user accounts for example corresponding to schools near the home of the child who uses the monitored device 12. The delegatee can for example include a school administrator or a child care administration service.

In a step 104, the monitoring manager 20 receives control instructions from the delegatee. The delegatee can provide the instruction through use of the delegatee account via the delegatee user application 29 using the client device 18. Further, control instructions can be received from the delegator through use of the delegator account via the delegator user application 28 using the client device 16. The delegator user application 28 and the delegatee user application 29 can alternatively be provided as a single application, such as a web based application.

In a step 106, the monitoring manager 20 via the mapping engine 24 and the association engine 36 associates a particular geographic area and/or a particular time frame with the delegatee. The associating can be made based on location or scheduling data provided by the delegatee or other source. For example a delegatee such as a school administrator can provide address information for the school and provide schedule hours when school classes are in session, and the mapping engine 24 can determine a geographic area where the school is located based on the address data and associate that geographic area and the schedule hours with the delegatee party. The association data is stored in the user datastore 34.

It is determined in a step 108 if a current location of the monitored device 12 and/or a current time corresponds to the particular geographic area and/or the particular time frame associated with the delegatee. For example it is determined if the monitored device 12 is located in a geographic area which defines a monitored child's school property, or it is determined that a current time corresponds to specified school hours of 9:00 am-12:00 pm or 1:00 pm-3:00 pm, or it is determined that the monitored device 12 is located on a geographic area which defines a monitored child's school property during the specified school hours of 9:00 am-12:00 pm and 1:00 pm-3:00 pm.

If the current location of the monitored device 12 and/or a current time corresponds to the particular geographic area and/or the particular time frame associated with the delegatee, in a step 110 one or more device controls of the monitored device 12 are delegated from the delegator to the delegatee. This delegation can be implemented by the monitoring agent 13 via a processor of the monitored device 12 or by the monitoring manager 20 via a processor on a system implementing the monitoring manager. In a step 112, the control instructions received from the delegatee are applied when the one or more device controls are delegated to the delegatee. If the current location of the particular monitored device 12 and/or a current time does not correspond to the particular geographic area and/or the particular time frame, in a step 114 control of the monitored device 12 remains with the delegator, or one or more device controls previously delegated to the delegatee are undelegated, in which case control instructions if any provided by the delegator can be applied during such time. It should be understood that the delegator does not necessarily relinquish any controls by enabling a delegatee through delegation, but the delegatee gains control that they did not already have.

Control instructions can for example include a communication constraint restricting telephone communication by the monitored device 12. Control instructions can further include constraints restricting application use by the monitored device 12. Application use can be selectively constrained on the particular mobile device, wherein the control instructions comprise a listing of one or more particular applications not constrained on the monitored device 12 during a time when other applications are constrained.

Control instructions from the delegator and delegatee can be applied via the monitoring agent 13 or via the monitoring manager 20 locally on the device 12. Alternatively, the monitoring agent 13 or monitoring manager 20 can communicate constraints to a telecommunication carrier services application program interface (API) 49 configured to constrain phone communications, text communications, and network communications via telecommunication carrier systems in the network 40. The constraints can be communicated for example by the carrier integration application 38 based on determinations made by the enablement engine 22.

Applying the control instructions can include setting a particular geographic constraint on the monitored device 12, wherein a location of the monitored device 12 is determined for example via the LDS 11. It is determined based on the device's location if the monitored device 12 has violated the particular geographic constraint, and an alert is provided to the delegator or delegatee responsive to determining that the monitored device 12 has violated the particular geographic constraint. The geographic constraint can include for example a geographic area corresponding to a school property wherein the alert is provided if the mobile device is determined to have left the school property during school hours of 9:00 am to 2:00 pm.

Applying the delegatee's control instructions can include associating a mobile device 30 ("delegatee device") to the delegatee to define a dynamic geographic area. When control is delegated to the delegatee, at a specified time the location of the delegatee device 30 can be determined, the location of the monitored device 12 relative to the delegatee device 30 can be determined, and an alert based on the determined relative location can be generated. For example, an alert can be transmitted when the monitored device 12 is positioned from the delegatee device 30 at a distance exceeding a particular threshold distance. Where the delegatee is a school administrator, the delegatee device 30 can correspond for example to a mobile device carried by a teacher supervising a group of students on a field trip, wherein one or more of those students carry a monitored device 12, and wherein the alert can be transmitted to the teacher's delegatee device 30 when a student wanders away from the group.

A delegatee can perform modifications to the control instructions via the delegatee user application 29 for example changing a geographic area associated with the delegatee, changing a time frame associated with the delegatee, or adding a delegatee device 30 defining a dynamic geographic area associated with the delegatee. A notification is provided to the delegator informing the delegator of the modification to the control instructions, for example via the delegator user application 28, email, or Short Message Service ("SMS") message. A permission from the delegator to apply the modification to the control instructions can be required prior to applying the modified control instructions from the delegatee. Absent the permission of the delegator, the modifications to the control instructions are not applied, and the control instructions of the delegatee prior to the modification are applied when controls are delegated to the delegatee.

The delegator can communicate exceptions to control instructions provided by the delegatee. The control instructions received from the delegatee are applied to constrain communication or application use on the particular mobile device as mitigated by one or more exceptions indicated by the delegator. An exception to the control instructions can include for example one or more phone number to which communication is not constrained or one or more applications the use of which is not constrained.

Control instructions received by a network connectable server implementing the monitoring manager 20 can be provided to the particular monitored device 12 through the network 40 via the monitoring agent 13. The monitoring agent 13 enabled by an application on the device 12 can receive and apply the control instructions to constrain communication or application use on the monitored device 12. Control instructions can be stored in the user datastore 34. The monitored device 12 via the monitoring agent 13 can retrieve the control instructions by accessing the monitoring manager 20 via the monitoring API 32. The monitoring agent 13 can then apply the control instructions via a particular application executing on the monitored device 12 to constrain communication and/or application use on the monitored device 12.

Figure 3:
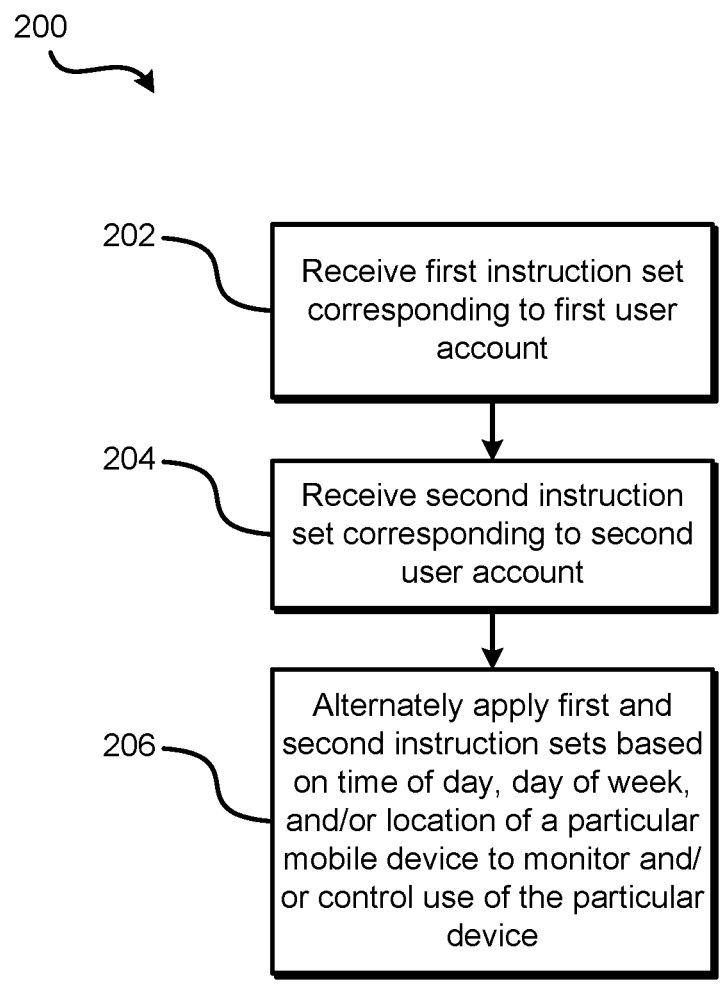

Referring to FIG. 3, a further illustrative embodiment is shown by a diagram representative of a method 200. The method 200 is described with reference to the components shown in the system 10 of FIG. 1, including the monitoring manager 20 and monitoring agent 13, which are configured for performing the method 200 and include or have access to suitable non-transitory data storage with instructions for performing the method 200. The method 200 may alternatively be performed by the monitoring agent 13 alone, the monitoring manager 20 alone, or via other suitable systems and devices. The method 200 is not limited to the components shown in FIG. 1 which are merely exemplary, and while the steps are provided in numbered order, they need not be performed in the order shown in FIG. 3.

In a step 202 of the method 200 the monitoring manager 20 receives a first instruction set corresponding to a first user account of a first party, the first instruction set directed to mobile device monitoring and/or mobile device control. In a step 204 the monitoring manager 20 receives a second instruction set corresponding to a second user account of a second party, the second instruction set directed to mobile device monitoring and/or mobile device control. In a step 206, one or more processors alternately applies the first instruction set and the second instruction set based on one or more of a time of day, a day of week, and a location of a particular mobile device 12 to monitor and/or control use of the particular mobile device 12 ("monitored device").

The first and second instruction sets can be received respectively via the first user account and the second user account, for example by a first user and a second user logged on to the respective accounts on a network connectable server which enables the monitoring manager 20. The first user and second user can log on using client devices 16, 18. The instruction sets can be applied by the monitoring manager 20 and/or the monitoring agent 13. For example, the monitoring manager 20 or the monitoring agent 13 can provide instructions to a telecommunication carrier services API 49 to constrain phone communication, internet use, and transmission and receipt of text messages by a monitored device 12 through implementation of telecommunication carrier network controls. Alternatively, the monitoring agent 13 can apply such constraints by device controls directly on the monitored device 12.

The first party can provide one or more exceptions to the second instruction set from the second user. For example if the second instruction set provides a communication constraint restricting telephone communication by the monitored device 12, an exception to the second instruction set can include one or more unrestricted telephone numbers, wherein applying the second instruction set includes allowing communications corresponding to the one or more unrestricted telephone numbers and disallowing communications to or from other telephone numbers. Alternatively, if the second instruction set provides a constraint restricting application use by the monitored device 12, the exception to the second instruction set can include an indication of one or more unrestricted applications, wherein applying the second instruction set can include allowing use of the one or more unrestricted applications by the monitored device 12 and disallowing use of a plurality of other applications by the monitored device 12.

The delegator user application 28 can provide one or more identifiers to the first party for designation, for example identifiers corresponding to nearby schools. Responsive to receiving a designation of the identifier corresponding to the second user account by the first party, the monitoring manager 20 or the monitoring agent 13 alternately applies the second instruction set corresponding to the second account to monitor and/or control use of the monitored device 12.

A geographic area can be associated with the second party by the association engine 36, for example based on information received by the second party via the delegate user application 29. The monitoring agent 13 can determine the monitored device 12 has entered the geographic area based on data received from the monitoring manager 20, or the monitoring agent 13 can provide device location information to the monitoring manager 20 to allow the monitoring manager 20 to make such determination via the mapping engine 24. The second instruction set is applied responsive to the determination that the mobile device has entered the geographic area associated with the second party. The associated geographic area can be static for example corresponding to a school property or dynamic, for example corresponding to the determined position of a mobile device 30 of a school administrator. Further, a particular time frame can be associated with the second party, wherein the second instruction set is applied during the particular time frame or during the particular time frame when the mobile device is located in the particular geographic area.

Figure 4:
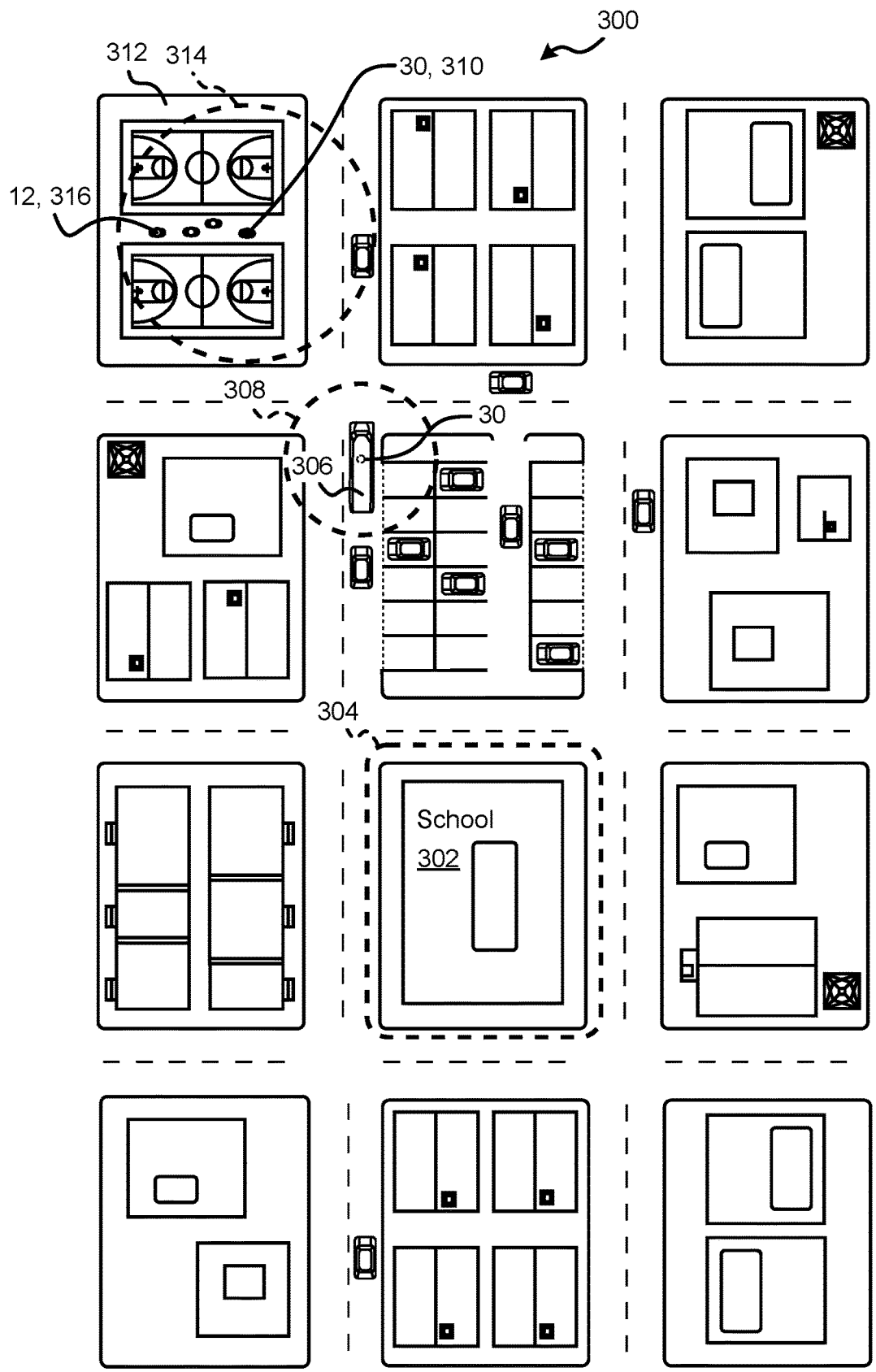
FIG. 4 is a plan view of an example city streetscape shown for the purpose of demonstrating an exemplary implementation of a described method.

Following is an exemplary implementation of the above described methods where the delegator is a parent, the monitored user is a school aged child of the parent, and the delegatee is an administrator of a school attended by the child. The implementation is described with respect to the system 10 of FIG. 1. A plan view of an example city streetscape 300 is shown in FIG. 4 for the purpose of demonstrating the exemplary implementation.

The parent installs a particular application ("child evaluation app") on the child's mobile device 12 ("monitored device"). A school official communicates with a server running the monitoring manager 20 via an interface enabled by the delegatee user application 29 on the official's client device 18. The school official creates a school identifier ("school ID") including for example all or portions of the school name. The school official creates a school location identifier ("location ID"). There can be multiple location IDs associated with a particular school ID.

For a static school location, the mapping engine 24 creates a geographical border (i.e., geofence) describing the boundaries of the school property. Alternatively a latitude/longitude position with an associated radius around the latitude/longitude position or other method can be used to describe the school location. Referring to FIG. 4, the exemplary city streetscape 300 includes a school building 302 shown positioned within a figurative geographical border 304 generated by the mapping engine 24 corresponding to school property.

For a dynamic school location, the location of the school is associated with one or more mobile devices 30 comprising a reporting agent 31 for reporting location (e.g, GPS location) of the devices 30. A mobile device 30 can be associated with a radius defining a circular area around a particular mobile device 30. The mobile device 30 can for example be located on a school bus or held by a teacher chaperoning a class outing. In such case a child carrying a monitored device 12 can be required to maintain a particular distance from such school bus or chaperone. In the exemplary streetscape 300, a school bus 306 carries a mobile device 30, and the reported position of the mobile device 30 is used by the mapping engine to generate a figurative geographic border 308 based on a radius extended from the mobile device 30 on the bus 306. A teacher 310 on a playground 312 carries a mobile device 30 which is used to generate a figurative geographic border 314, and children 316 carrying monitored devices 12 must remain within the geographic border 314 or an alert is triggered.

The school official further specifies constraints on device usage via the delegatee user app 29. Constraints can include preventing use of functional components of children's mobile devices 12 (e.g., prevent calling, text messaging, and application use) while the devices 12 are located on school property. Optionally, the school official can define a day or days when constraints are active, for example, only active on the day Mar. 12, 2014 (the day of a class trip), or a set of days such as weekdays between Sep. 1, 2013 and Jun. 12, 2014. Optionally, the school official can define time ranges, for example preventing use of functional components of the children's mobile devices 12 on school property between the hours of 9:00 AM and 3:00 PM. The school official can grant exceptions to the constraints for example allowing phone calls to be made to the police, fire department, or school officials, or allowing use of academically oriented applications or allowing browser access to academically oriented web sites.

The monitoring manager 20 associates school constraints with the school ID and the school location IDs via the association engine 36, which associations are stored in the user datastore 34. School location IDs can be added and deleted. For example, a school location ID can be created for a particular teacher leading a class trip for the day of the class trip by enabling the reporting agent 31 on the particular teacher's mobile device 30.

In the exemplary implementation, a parent of the monitored child communicates with the monitoring manager 20 via an interface enabled by the delegator user app 28 on the parent's client device 16. The parent creates a parent identifier ("parent ID") and associates the phone number of their child's mobile device 12 with the parent ID. The parent creates a set of exceptions to be applied to the school constraints.

Figure 5A:
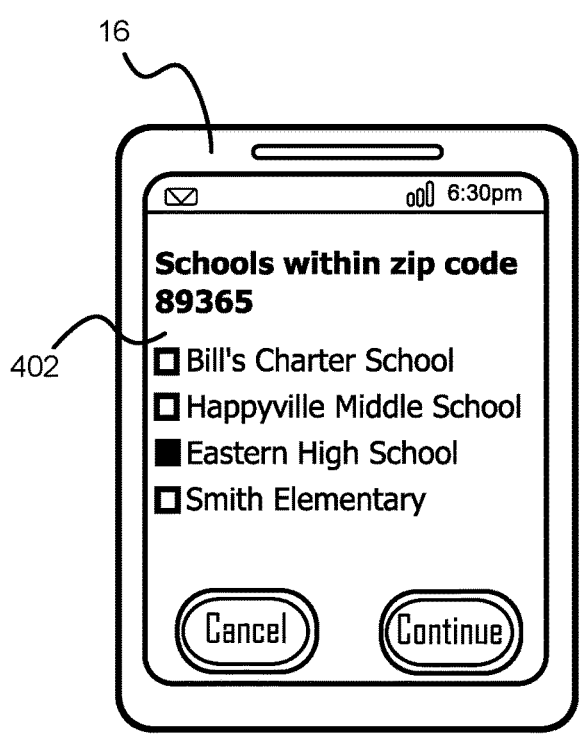
FIGS. 5A-5D show exemplary display interfaces on a mobile device.

The parent enters or selects a school ID for consideration. Referring to FIG. 5A, an exemplary display interface 402 enabled by the delegator app 28 on a client device 16 shows an exemplary list of school IDs ("Bill's Charter School", "Happyville Middle School", "Eastern High School", and Smith Elementary) within a particular zip code for selection by the parent. In the exemplary interface 402 the parent selects Eastern High School.

Figure 5B:
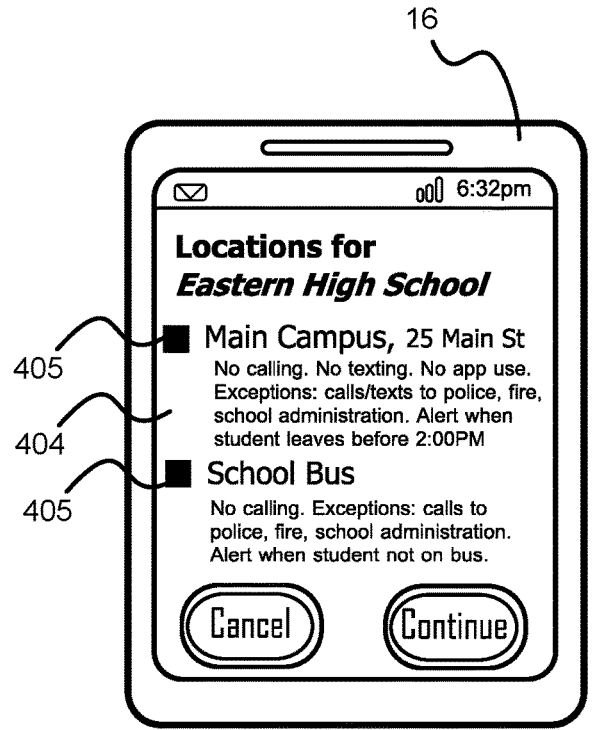

The monitoring manager 20 returns a list of location IDs with their associated constraints corresponding to the entered/selected school ID responsive to entering/selecting the desired school ID. Referring to FIG. 5B, an exemplary display interface 404 enabled by the delegator app 28 on the client device 16 shows exemplary location IDs corresponding to Eastern High School. The location ID "Main Campus" is a static location ID which corresponds to the address of Main Campus, 25 Main Street. Explanatory text describes the constraints (i.e., "No calling. No texting . . . ") corresponding to Main Campus of Eastern High School. The location ID "School Bus" is a dynamic location ID which correspond to a school bus which transports students from their homes to Eastern High School Main Campus. Explanatory test describes the constraints (i.e., "No calling . . . ") corresponding to the School Bus location ID. In the exemplary interface 404 the Main Campus and School Bus are shown as selected based on filled selection boxes 405.

Figure 5C:
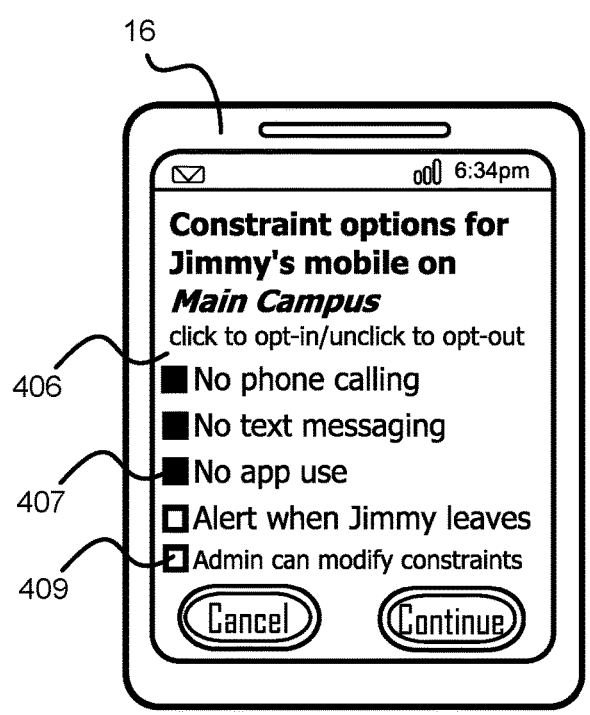

The parent can select a particular school location ID from the school location ID list to view a list of all of the constraints associated with the selected school location ID. The parent can opt-in to all, some, one, or none of the listed constraints. The opt-in can be conditional to not allowing any changes to the constraints. Referring to FIG. 5C, an exemplary display interface 406 enabled by the delegator app 28 on the client device 16 shows exemplary constraints corresponding to a parent's selection of the Main Campus location ID including "No phone calling", "No text messaging", "No app use", and "Alert when Jimmy leaves [school]". The interface 406 further includes the option that a school official can modify constraints ("Admin can modify constraints"). In the exemplary interface 406, it is shown that the parent opts-in to the constraints "No phone calling", "No text messaging", "No app use" based on the shown filled selection boxes 407. It is shown that the parent opts-out of the constraint "Alert when Jimmy leaves [school]" and the rule allowing admin constraint modifications based on the shown unfilled selection boxes 409. If constraints associated with a school location ID are modified, for example by a school official, an alert is sent to the parent or an automatic opt-out of the child monitored device 12 from the school constraint is performed depending whether the parent has opted-in to allow constraint modifications. Further, the parent can opt-in or opt-out of modifications to a constraint responsive to such alert.

Absent consent of the parent, the school official does not know what child devices 12 have been associated with their school ID, and the school official does not have access to data describing the usage of the child device 12. The monitoring manager 20 accordingly protects the privacy of the child and the parent. The monitoring manager 20 associates parent data including the information provided by the parent with the parent ID and stores this information in the user datastore 34.

The monitoring agent 13 accesses the server running the monitoring manager 20 to retrieve the school constraints and the parent's exception data, as well as any parent constraints, via the monitoring API 32. The monitoring manager 20 further notifies the monitoring agent 13 when there are updates to either the parent data or school data, and the updates are loaded into the child's monitored device 12 via the monitoring agent 13.

Figure 5D:

If a dynamic school location ID exists, the reporting agent 31 enabled by the school evaluator app running on the school mobile device 30 corresponding to the dynamic school location ID, updates the monitoring manager 20 as to its current location. The monitoring agent 13 tracks the location of the child's monitored device 12, and the attempted usage of that device. If the child's monitored device 12 is associated with a dynamic school location ID, the server will update the monitoring agent 13 with the current location of the school mobile device 30 corresponding to the ID allowing the monitoring agent 13 to make a determination of whether the monitored device 12 is inside of or outside of a dynamic geographic area corresponding to the school mobile device 30. Referring to FIG. 5D, an exemplary display interface 408 enabled by the delegator app 28 on the client device 16 shows exemplary alert message, "Jimmy did not get on the school bus Today", triggered responsive to a determination that the user "Jimmy" (the parent's son) of the mobile device 12 did not ride a bus corresponding to a particular dynamic school location ID on a particular day.

When the monitoring agent 13 detects a mobile device attempted usage violation of the school constraints for which there is no parent exception, for example attempting to send a text message to a friend, the usage will be disallowed or constrained. Alternatively, the monitoring agent 13 can simply lock functional components (e.g., applications, features, or settings) of the monitored device 12 preventing attempted use of such functional components by the child.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method of implementing controls corresponding to a first mobile device of a particular user which is subject to monitoring by a first party and a second party, the method comprising:
   receiving from the first party a designation of the second party;
   receiving via a computer network first control instructions from the first party;
   receiving via the computer network second control instructions from the second party;
   receiving from the second party a modification to the second control instructions by the second party, the modification to the second control instructions by the second party comprising a designation of a second mobile device for defining a dynamic geographic area based on a location of the second mobile device;
   providing a notification to the first party indicating the modification to the second control instructions by the second party comprising the designation of the second mobile device for defining the dynamic geographic area received from the second party;
   receiving from the first party a permission to apply the modification to the second control instructions by the second party;
   determining by the first mobile device at least one of a first location of the first mobile device or a first time;
   delegating by at least one processor at least one device control of the first mobile device from the first party to the second party at least based on the at least one of the first time relative to a particular time frame or the first location of the first mobile device relative to a particular geographic area;
   applying by the first mobile device the second control instructions as modified during a period of time when the at least one device control of the first mobile device is delegated to the second party to at least one of enable or disable a functional component of the first mobile device responsive to receiving the permission from the first party, the applying of the second control instructions as modified comprising defining the dynamic geographic area based on the location of the second mobile device;
   determining by the first mobile device a second location of the first mobile device;
   determining whether the second location of the first mobile device is within the dynamic geographic area; and
   providing an alert to at least one of the second mobile device, the first party or the second party based on whether the second location of the first mobile device is within the dynamic geographic area.

2. The method of claim 1, further comprising:
   determining by the first mobile device at least one of a third location of the first mobile device or a second time;
   transferring by the at least one processor the at least one device control of the first mobile device from the second party to the first party based on the at least one of the third location of the first mobile device or the second time; and
   applying by the first mobile device the first control instructions received from the first party during a period of time when the at least one device control of the first mobile device is transferred to the first party to at least one of enable or disable the functional component of the first mobile device.

3. The method of claim 1, wherein providing the notification to the first party comprises transmitting an SMS message to the first party.

4. The method of claim 1, wherein the particular geographic area comprises the dynamic geographic area.

5. The method of claim 1, further comprising delegating the at least one device control of the first mobile device from the first party to the second party at least based on the first location of the first mobile device relative to the location of the second mobile device.

6. A method of implementing controls corresponding to a first mobile device of a particular user which is subject to monitoring by a first party and a second party, the method comprising:
   receiving via a computer network a first instruction set via a first user account of the first party, the first instruction set directed to at least one of mobile device monitoring or mobile device control;
   receiving via the computer network a second instruction set via a second user account of the second party, the second instruction set directed to at least one of mobile device monitoring or mobile device control;
   determining at least one of a first time of day, a first day of the week, or a first location of the first mobile device;
   applying by at least one processor of the first mobile device the first instruction set at least one of during the first time of day, during the first day of the week, or during a period of time when the first mobile device is located at the first location to at least one of enable or disable a functional component of the first mobile device;
   determining at least one of a second time of day, a second day of the week, or a second location of the first mobile device;
   applying by the at least one processor of the first mobile device the second instruction set at least one of during the second time of day, during the second day of the week, or during a period of time when the first mobile device is located at the second location to at least one of enable or disable the functional component of the first mobile device;
   receiving via the computer network a modification to the second instruction set by the second party via the second user account of the second party, the modification to the second instruction set by the second party comprising a designation of a second mobile device for defining a dynamic geographic area based on a location of the second mobile device;
   transmitting a notification to the first party indicating the modification to the second instruction set by the second party comprising the designation of the second mobile device for defining the dynamic geographic area to create a modified instruction set;
receiving via the computer network from the first party a permission to apply the modified instruction set;
determining at least one of a third time of day, a third day of the week, or a third location of the first mobile device;
applying by the at least one processor of the first mobile device the modified instruction set at least one of during the third time of day, during the third day of the week, or during a period of time when the first mobile device is located at the third location, the applying of the modified instruction set comprising defining the dynamic geographic area based on the location of the second mobile device;
determining whether the third location of the first mobile device is within the dynamic geographic area; and
at least one of enabling or disabling the functional component of the first mobile device based on whether the third location of the first mobile device is within the dynamic geographic area.

7. A computing system comprising at least one non-transitory computer readable storage medium having encoded thereon commands that, when executed by one or more processors of the computing system, cause the computing system to perform a process including:
receiving from a first party a designation of a second party for enabling control of a first mobile device of a particular user, the particular user subject to monitoring by the first party and the second party;
receiving via a computer network first control instructions from the first party;
receiving via the computer network second control instructions from the second party;
receiving from the second party a modification to the second control instructions by the second party, the modification to the second control instructions by the second party comprising a designation of a second mobile device for defining a dynamic geographic area based on a location of the second mobile device;
providing a notification to the first party indicating the modification to the second control instructions by the second party comprising the designation of the second mobile device for defining the dynamic geographic area received from the second party;
receiving from the first party a permission to apply the modification to the second control instructions by the second party;
determining at least one of a location of the first mobile device or a time of day;
delegating at least one device control of the first mobile device from the first party to the second party at least based on the at least one of the location of the first mobile device or the time of day;
applying the second control instructions as modified during a period of time when the at least one device control is delegated to the second party to at least one of enable or disable a functional component of the first mobile device responsive to receiving the permission from the first party, the applying of the second control instructions as modified comprising defining the dynamic geographic area based on the location of the second mobile device, and the delegating of the at least one device control of the first mobile device from the first party to the second party at least based on the location of the first mobile device relative to the location of the second mobile device;
determining whether the location of the first mobile device is within the dynamic geographic area; and
providing an alert to at least one of the second mobile device, the first party or the second party based on whether the location of the first mobile device is within the dynamic geographic area.

8. The computing system of claim 7, wherein the second mobile device is used by a third party.

* * * * *